Figure 4:
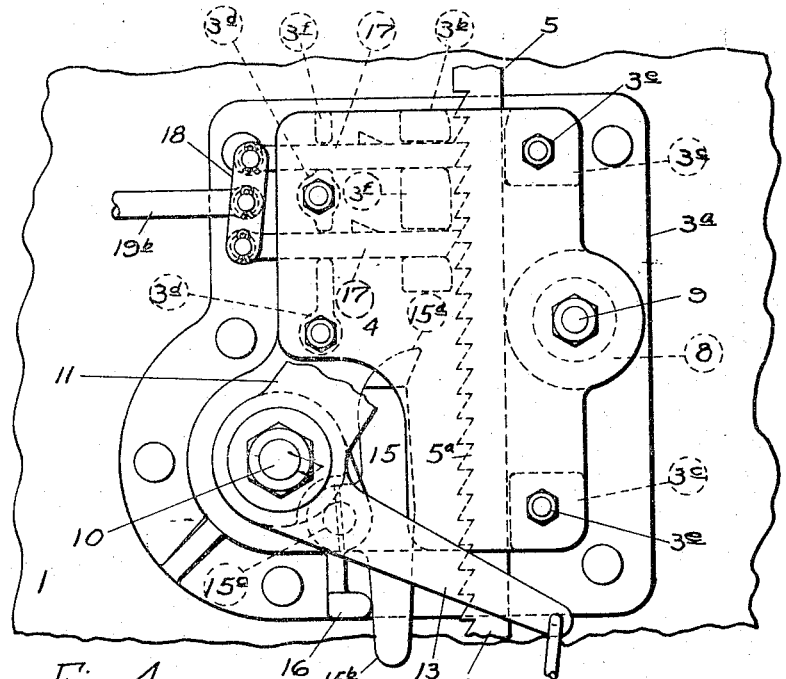
Figure 5:
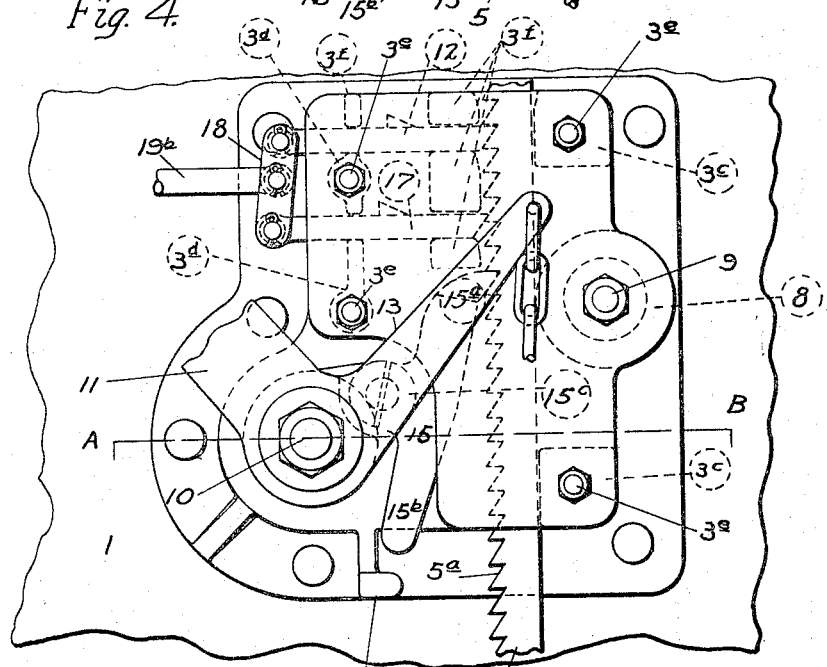
Figure 6:
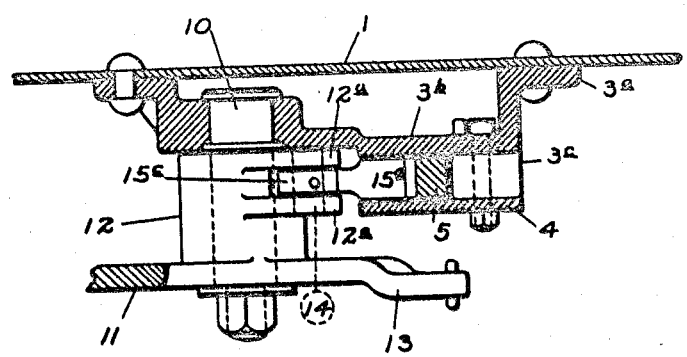

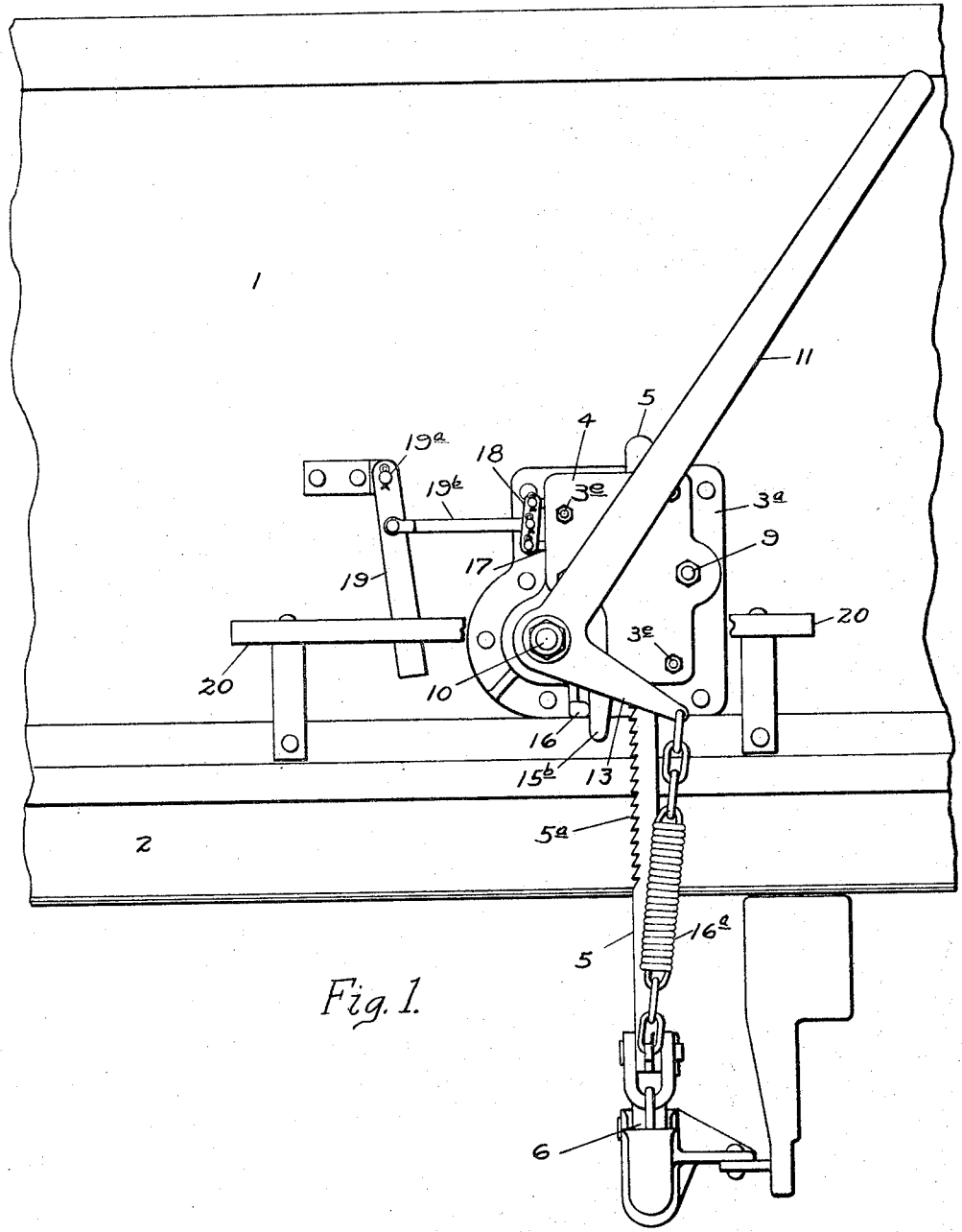

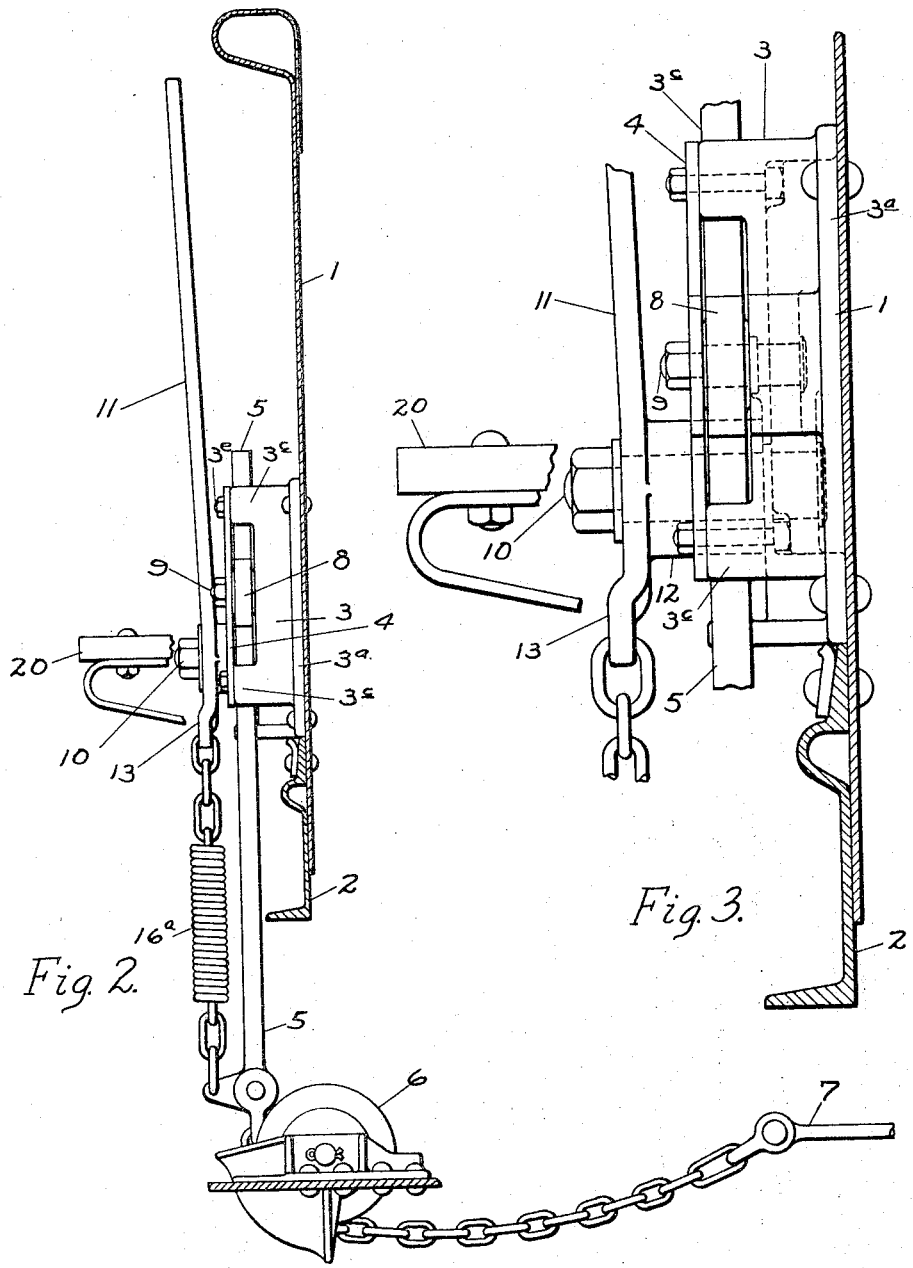

W. G. RANSOM.
LEVER HAND BRAKE FOR RAILWAY CARS.
APPLICATION FILED JUNE 1, 1914.

1,171,642.

Patented Feb. 15, 1916.
4 SHEETS—SHEET 3.

Witnesses:

Inventor:
Willard G. Ransom.
per _____
Attorney.

W. G. RANSOM.
LEVER HAND BRAKE FOR RAILWAY CARS.
APPLICATION FILED JUNE 1, 1914.

1,171,642.

Patented Feb. 15, 1916.
4 SHEETS—SHEET 4.

Witnesses:
R. E. Neil
C. H. Lohmann.

Inventor:
Willard G. Ransom
per
Attorney.

UNITED STATES PATENT OFFICE.

WILLARD G. RANSOM, OF DAVENPORT, IOWA.

LEVER HAND-BRAKE FOR RAILWAY-CARS.

1,171,642.　　　　　Specification of Letters Patent.　　Patented Feb. 15, 1916.

Application filed June 1, 1914.　Serial No. 842,039.

*To all whom it may concern:*

Be it known that I, WILLARD G. RANSOM, a citizen of the United States of America, and resident of Davenport, Scott county, Iowa, have invented a certain new and useful Improvement in Lever Hand-Brakes for Railway-Cars, of which the following is a specification.

My invention relates to improvements in hand brakes of the lever type for railway cars or other vehicles, and has for its object the providing of a structure at once durable, simple, quick acting and highly efficient, whereby a perfect "application" or complete "release" of the brakes is effected by a single—one movement—of the lever regardless of ordinary brake shoe wear or slack in connecting parts. These and other objects which will hereinafter appear I attain by the mechanism illustrated in the accompanying drawings, in which—

Figure I is a front elevation of my improved device as applied to the end of the gondola or freight car. Fig. II is a side elevation thereof partly in section. Fig. III is a side elevation of an enlarged detail. Fig. IV is an enlarged detail showing relative position of the various elements of the device with brakes in "release" position.
Fig. V is a similar detail with brakes "set" and Fig. VI is a sectional view taken on line A—B of Fig. V with lever and dog shown full.

While I have shown the device as applied to the end of an ordinary gondola in which 1 is the end sheet and 2 the end sill, it is to be understood that it can be applied to most any type of freight car or vehicle. The bracket 3 which is securely riveted to the end sheet 1 by the marginal flange 3ª is provided with the raised base or floor 3ᵇ. Rising from the base and made integral therewith are the lugs 3ᶜ and 3ᵈ. Resting on the outer ends of these lugs and securely bolted thereto by the bolts 3ᵉ is the cover plate 4. Between the cover plate and floor 3ᵇ the heavy steel ratchet bar 5 is loosely fitted for free and easy reciprocation. It is made to pass entirely through the bracket 3 and is attached to the usual hand brake chain at its lower end, which chain is passed over the sheave 6, properly supported from the car body, and connected to the usual brake rod 7. The upper half of the ratchet bar on its front face is provided with the ratchet teeth 5ª.

The rear face of the ratchet bar contacts the anti-friction guide roller 8. The inner faces of the lugs 3ᶜ are brought in close proximity to the ratchet bar to act as further means to properly guide it in its upward and downward movement. This guide roller 8 is held between the cover plate 4 and floor 3ᵇ by the bolt 9 and is of a diameter to relieve excessive pressure of the ratchet bar against the lugs 3ᶜ.

Secured to the floor 3ᵇ in its thickened portion is the stud 10, mounted loosely on this stud is the brake lever 11 which is provided with the integrally formed hub portion 12 and arm 13. Formed integrally with and extending at approximately right angles from the hub 12 are the jaws 12ª. Pivotally and loosely journaled between these jaws on the pin 14 is the pawl or dog 15. This pawl is provided with the broadened sharp nose 15ª and tail portion 15ᵇ. It is pivotally supported between the jaws 12ª through the medium of the rearwardly extending portion 15ᶜ in a manner to cause the point 15ª to naturally swing forward. It would then always be in contact with the ratchet bar teeth but when lever 11 is thrown forward or to "release" position, the tail portion 15ᵇ contacts lug 16 rising from flange 3ª, holding the pawl in a perpendicular position and at a distance from the ratchet bar as shown. The outer end of arm 13 is yieldingly connected to the lower end of the ratchet bar 5 by the spring 16ª. Slidably mounted between the floor 3ᵇ of bracket 3 and the cover plate 4 are the dogs 17 which are maintained in a horizontal position by the lugs 3ᶠ cast integral with the bracket floor 3ᵇ and contacting the underside of cover plate 4. One end of these dogs is made to contact the ratchet teeth 5ª of the bar 5 while the other end is pivotally connected between the links 18. The foot lever 19 which passes back of the usual footboard or run-board 20 (shown broken away in drawings) is swingingly connected at its upper end to the side of the car as at 19ª and jointedly connected to the links 18 at about their center of length by the rod 19ᵇ. With lever 11 in its forward position as shown in Figs. I and IV, ratchet bar 5 drops to its lowermost position, slacking off the chain connection to brakes thereby putting same in "release" position. On throwing lever 11 forward, jaws 12ª being formed integrally therewith are revolved forwardly and downwardly carrying pawl 15 back a considerable distance from the ratchet teeth 5ª. Dogs 17 are made to contact the ratchet bar by operator pushing lever 19 forward with his foot. When the lever 11 is rocked rearwardly on its pivot 10, arm 13 is moved from the position shown in Fig. IV to that shown in Fig. V. The outer end of this arm being about three times the distance from pivot 10 as is the pivot 14 of the pawl 15, moves about three times the distance in the same interval of time, and as the connection to the brake shoes is made to the end of this arm, by the time pawl 15 has moved up sufficiently to permit its tail end 15ᵇ to clear the lug 16 and the nose end 15ª rests against the ratchet bar teeth, the end of the arm has traveled far enough and fast enough to take up all the slack in the connections to the brake shoes and bring same in solid contact with the tread of the car wheels. The amount of further braking power would ordinarily be determined by the length of the lever 11 as compared to the length of the arm 13. Herein, however, lies the most important feature of my invention and, to my knowledge, differs from anything heretofore devised in the way of a quick acting high power lever brake. The connection from the end of arm 13 to the brake shoes being a yielding one, made so by the introduction of the spring 16ª, further movement of lever 11 after brake shoes have contacted the tread of the wheels, not only becomes possible, but there is immediately available a leverage power which has been increased from about four to one (the length of lever 11 and arm 13) to about fourteen to one (the length of lever 11 and jaws 12ª). If the spring 16ª was not inserted in the connection from arm 13 to the brake shoes, thus making it an unyielding one, the maximum leverage or retarding effort would be determined by the relative length of lever 11 and arm 13, but in making the connection a yielding one, a force as determined by the relative length of lever 11 and jaws 12ª becomes effective.

I am aware that prior to my invention lever brakes have been made wherein a portion or part of the device is given an accelerated movement at the initial movement of the main lever, whereby under favorable conditions the slack is taken up by a limited movement of the main lever and the brakes set by a completion of this movement, but in every instance these devices fail for lack of power or are rendered practically inoperative or at least very inefficient if there be little or no slack (when connections and brake shoes are new) or too much slack (when connections are stretched and shoes are worn). With my device the amount of slack can in no manner interfere with its efficiency. If there be little or no slack, permitting arm 13 to move but part way in its travel from "release" to "set" (or from position shown in Fig. IV to that shown in Fig. V) the moment the tail end 15ᵇ of pawl 15 has cleared stop 16 the maximum power becomes effective as explained above. If there be slightly more slack than can be absorbed by the sweep of arm 13 in its limits of movement as produced by a single complete movement of lever 11, all the slack that is taken up by such movement can be held by manipulating dogs 17—17 as above explained and lever 11 given another movement or part of movement at which time an immediate increase of power through the action of pawl 15 becomes effective. Sufficient slack to make necessary a second movement of lever 11 would be very unusual and would never be called for in connection with brake equipment subject to ordinary care and inspection.

What I claim is—

1. In a car brake, the combination of a longitudinally reciprocating ratchet bar, a lever having a long arm and a short arm, capable of rotation about a common axis, and a yielding connection between said long arm and said ratchet bar.

2. In a car brake, the combination of a longitudinally reciprocating bar, a lever having a long arm and a short arm capable of rotation about a common axis, said short arm adapted to be rigidly connected to said ratchet bar by the rotation of said lever on its axis.

3. In a car brake, the combination of a ratchet bar capable of longitudinal reciprocation, a lever, a long arm and a short arm associated with said lever and capable of rotation about a common axis, said lever having a yielding connection to said ratchet bar through said long arm, and a rigid connection to said ratchet bar through said short arm.

4. In a car brake, the combination of a ratchet bar capable of longitudinal reciprocation, a lever provided wtih a long and short arm extending at right angles thereto and all capable of rotation about a common axis, means forming a quick acting low power connection between said lever and ratchet bar during the initial movement of said lever and a high power slow acting connection during the remainder of said lever movement.

5. In a car brake, the combination of a ratchet, a lever, means connecting said lever and ratchet whereby a low power quick action followed by a high power slow action is imparted to said ratchet by a single movement of said lever.

6. In a car brake, the combination of a ratchet bar capable of longitudinal reciprocation, a lever, means whereby a low power quick acting connection followed by a high power slow acting connection between said lever and ratchet bar is effected by a single movement of said lever.

7. In a car brake, the combination of a bracket, a ratchet bar adapted to reciprocate through said bracket, a lever provided with a long and short arm rotatably mounted on said bracket, a pawl pivotally connected to said short arm capable of contact with said ratchet bar by the swinging of said lever, and a yielding connection between said long arm and said ratchet bar.

8. In a car brake, the combination of a ratchet directly connected to the brake chain, a lever, means connecting said lever and ratchet whereby a low power quick action followed by a high power slow action is imparted to said ratchet.

9. In a car brake the combination of a ratchet, a lever, means yieldingly connecting said lever and ratchet whereby a low power quick action is imparted to said ratchet, and means rigidly connecting said lever and ratchet whereby a high power slow action is imparted to said ratchet.

Signed by me at Davenport, Iowa, this 29th day of May, 1914.

WILLARD G. RANSOM.

Witnesses:
R. E. NEILS,
C. J. W. CLASEN.

Copies of this patent may be obtained for five cents each, by addressing the "Commissioner of Patents, Washington, D. C."